Nov. 16, 1954

J. E. HAUSER 2,694,376

EXPANDABLE MANDREL

Filed Jan. 10, 1951

Joseph E. Hauser
INVENTOR.

BY Cecil L. Wood

ATTORNEY

Nov. 16, 1954
J. E. HAUSER
2,694,376
EXPANDABLE MANDREL
Filed Jan. 10, 1951
2 Sheets-Sheet 2
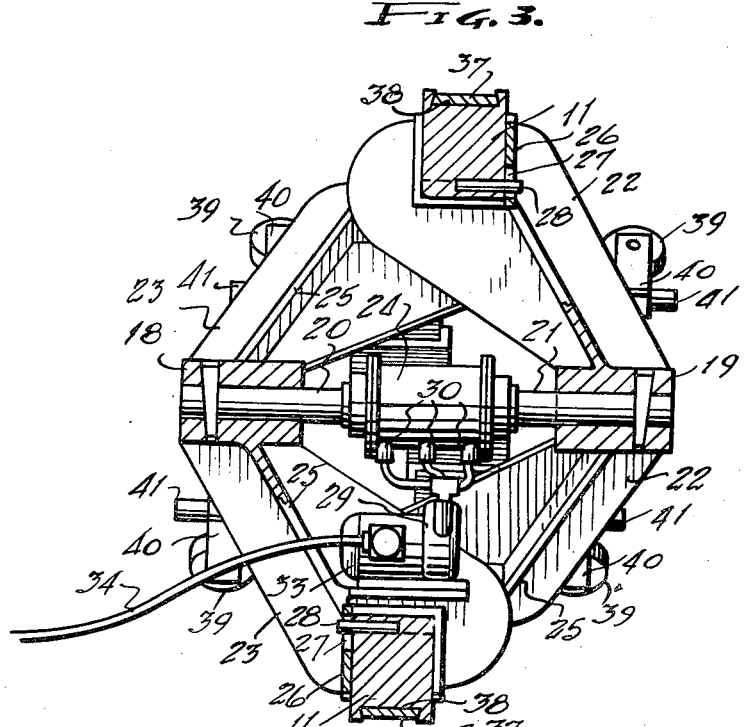
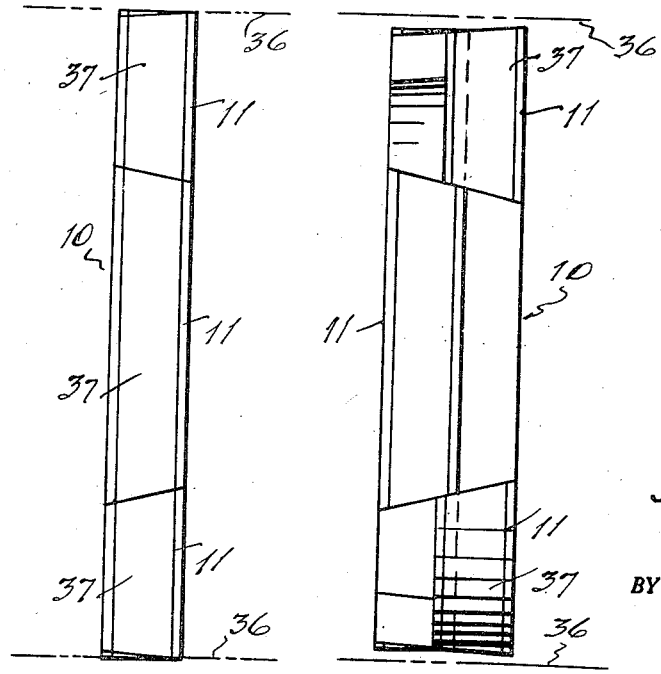
Joseph E. Hauser
INVENTOR.
BY Cecil L. Wood
ATTORNEY

United States Patent Office 2,694,376
Patented Nov. 16, 1954

2,694,376

EXPANDABLE MANDREL

Joseph E. Hauser, Fort Worth, Tex.

Application January 10, 1951, Serial No. 205,299

6 Claims. (Cl. 113—103)

This invention relates to expanding and contracting mandrels for joining pipe sections for welding into a pipe line, and it has particular reference to a mechanism which is capable of being operated along the interior of the pipe, from joint to joint, and operate to align the sections and back up the weld, and its principal object resides in the provision of a practical mechanism which is capable of being readily expanded to engage the interior surfaces of the pipe at the joints thereof and firmly support the same while the sections are welded together.

Another object of the invention resides in the provision of a mandrel for welding pipe sections in a pipe line whereby such sections can be maintained in accurate alignment during the process of welding the same, and affording a mechanism which can be readily and easily released at will to be moved the length of a section and re-established for securing the next joint, with the least loss of time and expended effort.

A still further object of the invention resides in the provision of a mechanism of the character described in which is embodied an arrangement of elements whereby is provided a heat resisting surface against which welding operations can be performed while retaining the pipe sections in positive alignment, and whereby such surface can be retracted and the assembly supporting the same can be moved through the pipe to the next section and the mandrel expanded to form a base for the next joint, a suitable carriage being provided for conveying the assembly along the pipe line thus joined.

Broadly, the invention contemplates the provision of a device wherein is embodied features of construction adapting the same to be economically employed in the joining of sections of pipe or conduit for the transport of water, oil, and the like, over many miles, and whereby the sections of said pipe line can be welded together with a minimum of cost in labor and materials.

While the foregoing objects are paramount, other and lesser objects will become manifest as the description proceeds, taken in connection with the appended wherein:

Figure 3 is a vertical sectional view of the invention, on lines 3—3 of Figure 1, showing the mandrel in retracted positions and illustrating a hydraulic mechanism for operating the spider members.

Figure 4 diagrammatically illustrates the mandrel in expanded position in a pipe, the latter being shown in broken lines, and Figure 5 diagrammatically illustrates the mandrel retracted, the pipe being shown in broken lines, and the mandrel segments being shown offset or out of alignment.

In laying steel pipe of relatively large diameter it is common practice to join the sections by welding rather than by any of the outmoded methods, such as by packing the joints with oakum and lead. The sections are usually quite heavy and their accurate alignment is sometimes attended by certain difficulties, particularly where the tubing is not formed with the usual bell into which the spigot end of the pipe section is inserted and the joint packed.

It is therefore expedient to align the sections at each joint so that when the coupling is made the weld is smooth and straight, both sections being joined perfectly and the weld "backed up" by a mandrel having an even bearing against the entire inner surface of the pipe. The invention is so designed as to be capable of conveyance through an entire pipe line, from joint to joint, as the sections are placed in alignment, and the mandrel expanded to provide a firm backing for the weld.

Figure 1:
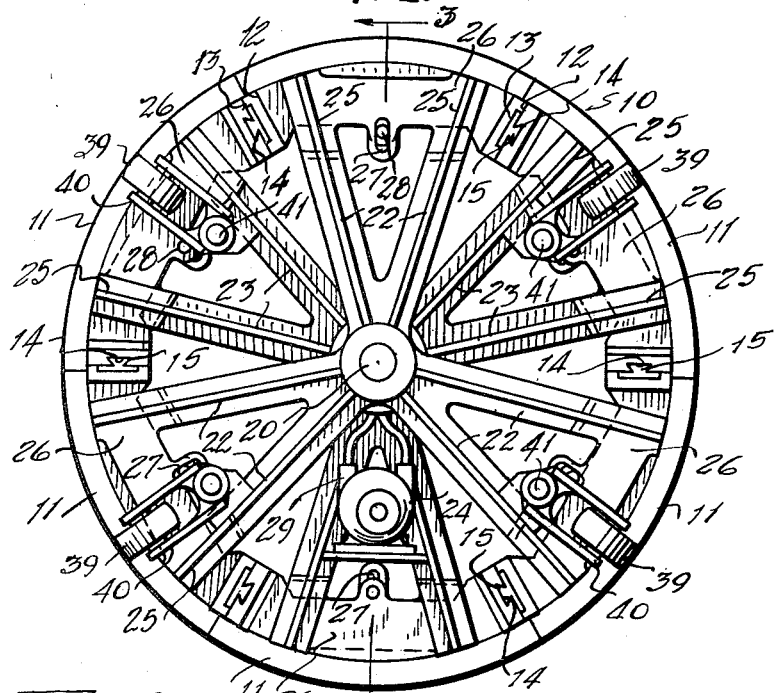
Figure 1 is an end elevational view of the invention illustrating the spider members positioned to fully expand the mandrel, and showing the interlocking connection between the several segments of the mandrel.
Figure 2:
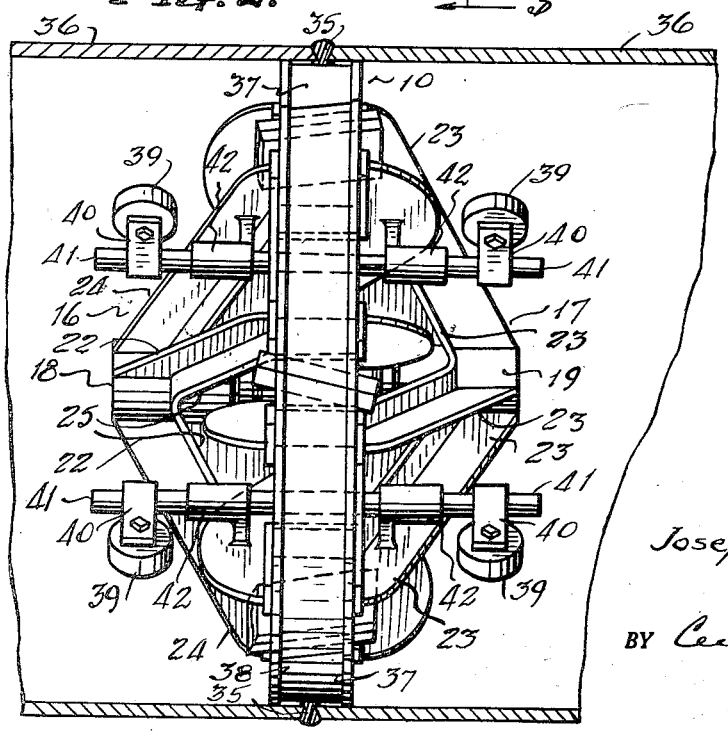
Figure 2 is a side elevational view of the invention as operatively arranged in a pipe, shown in longitudinal section, and illustrating a welded joint.

Accordingly, the invention comprises a circular mandrel 10 which is comprised of a plurality of segments 11 joined end to end, as shown in Figures 1 and 2, but capable of being moved out of alignment, as illustrated in Figures 3 and 5, and since the ends 12 and 13 of each of the segments 11 are obliquely angular in opposite arrangement, as shown particularly in Figures 4 and 5, the circular mandrel 10 is substantially reduced in diameter, although retaining its circular form, when the segments 11 are offset alternately or positioned in disalignment, as shown in Figure 3 when alternate sets of the segments 11 are moved simultaneously in a direction opposite to the companion set.

The ends 12 of each segment are formed with a dovetail groove 14 arranged transversely of the member 11 which is adapted to slidably receive a complementary boss 15 on the opposite end 13 of each of the segments 11 so that all of the segments 11 are interlocked at their ends but capable of lateral movement with respect to each other and, by reason of the opposing angular surfaces of the ends 12 and 13 of the segments 11, reduce the diameter of the mandrel 10.

A pair of spider members 16 and 17 are provided and these have hubs 18 and 19, respectively, which are keyed to shafts 20 and 21. Each of the spider members 16 and 17 has a plurality of pairs of radial arms 22 and 23, respectively, and each pair of the arms has a segment 11 operatively attached to their outer ends. The spider members 16 and 17 are oppositely arranged and are adapted to be moved toward and away from each other as the shafts 20 and 21 are moved into and out of a hydraulic cylinder 24 between the spider members 16 and 17, as shown in Figure 3.

Each of the arms 22 and 23 are re-inforced by webs 25 formed on each side and each pair of arms is connected at their outer ends by an integral plate 26 formed with a slot 27 through which a pin 28 is arranged by which each segment 11 is attached to the paired arms, as apparent in Figures 1 and 3, the slots 27 providing for inward and outward movements of the segments 11 as the spiders 16 and 17 are oppositely operated by the piston within the cylinder 24 which operation will also move the members 11 sidewise and out of alignment, the sliding connection between the segments 11, and the angular or oblique joint therebetween acting to contract the mandrel 10 to a lesser diameter.

Obviously, of course, there can be provided any means for moving the spider members 16 and 17 with respect to each other, such as by having a single shaft formed with right- and left-hand threads through the hubs 18 and 19 so that when the shaft is rotated the members 16 and 17 will move in opposite directions. Greater force can be applied to the mandrel 10, however, by some hydraulic mechanism such as that shown in Figures 1 and 3, and which comprises the cylinder 24, in which is arranged suitable pistons, with a pump 29 and fluid connections 30, 31 and 32. The pump 29 is operated by an electric motor 33 having electric conductors 34.

Each of the segments 11, in order to provide a suitable heat resistant backing for the weld 35 of the pipe sections 36, is preferably fitted with a strip of heat resistant metal 37, such as molybdenum or similar materials, about the crown so that a continuous backing will result around the entire circumference of the band or mandrel 10. For this purpose the segments 11 can be formed with a groove 38 about their outer perimeters, as shown in Figure 3. Also, in order to reduce heating from the welding operations the members 11 can be made hollow and suitable water connections made thereto so that water can be circulated through each segment 11 while welding operations are performed. This feature has not been illustrated but it is contemplated that this may be done if found desirable.

The assembly is entirely portable through the pipe line by reason of a carriage afforded by a plurality of rollers 39 which are attached by brackets 40 secured to shafts 41 which are arranged through bearings 42 integrally secured to the arms 22 and 23 of the spider members 16 and 17, as apparent in Figure 2. The bearings 42 are slidable along the shafts 41 to allow for the movement of the spider members 16 and 17 with respect to each other. The rollers 39 are retained in contact at all times with the inner surfaces of the pipe even when the segments 11 of the mandrel 10 are retracted since the spider members 16 and 17 only move longitudinally of the pipe sections.

Manifestly, the structure herein shown and described is capable of certain changes and modifications from time to time, by persons skilled in the art, without departing from the spirit and intent of the invention or the scope of the appended claims.

What is claimed is:

1. In an expanding mandrel for joining pipe sections by welding, the combination comprising a band formed by a plurality of segments having oblique tongue and groove sliding connections at their ends, a pair of opposingly arranged spider members, each having a hub and a plurality of pairs of radial arms, each pair of said arms having one of said segments movably connected to their outer ends, a shaft arranged through said hubs, means on said shaft between said spiders for moving the same in opposing directions on said shaft whereby to move said segments laterally out of axial alignment and expand and contract said band within a pipe, and a plurality of rollers arranged about each side of said band adapted to bear radially from said hub internally of a pipe.

2. In an expanding mandrel for joining pipe sections by welding, in combination, a segmental band formed by a plurality of longitudinally alignable segments, each having its ends opposingly oblique and formed with means for slidable interlocking connection with its companion segment, a pair of spider members, each having a hub and a plurality of pairs of radial arms extending therefrom, a shaft arranged in said hub members and slidably supporting the same for opposite movement with respect to each other, each pair of said arms having means on their outer ends for connecting one of said segments thereto for limited movement with respect to the axes of said hub members, and means on said shaft for moving said spider members longitudinally thereof.

3. In an expanding mandrel for joining welded pipe sections, in combination with a carriage movably supporting said mandrel through a pipe line, an expandable and contractable band formed of a plurality of longitudinally alignable segments, each of said segments having its ends opposingly oblique and means comprising a dove tail tongue and groove for providing an interlocking sliding coupling to its companion, a pair of spider members, each having a hub and a plurality of pairs of radial arms extending therefrom and operatively supporting one of said segments, a shaft slidably supporting said spiders for limited movement with respect to the axes of said hubs, means for moving said spiders in opposite directions whereby to urge said segments into or out of longitudinal alignment and expand and contract said band.

4. In a mechanism for joining pipe sections for welding, an expanding mandrel comprising a band formed of a plurality of interlocking segments, each of said segments having its ends obliquely slidable with respect to its adjacent segment and coupled thereto by means permitting lateral disalignment, a pair of spider members, each having a hub and paired radial arms, each pair of said arms having a segment connected to their outer ends for limited movement longitudinally of said arms, a shaft slidably supporting said spider members for operation in opposite directions, means on said shaft for moving said spider members longitudinally of said shaft, and a plurality of rollers supported on said arms and operating radially of said shaft providing mobility for the assembly along a pipe line.

5. In an expanding mandrel for joining pipe sections for welding, the combination comprising a sectional band formed with a plurality of longitudinally alignable segments, each having its ends obliquely angled in opposite directions and having means for laterally slidable interlocking connection with its companion, a pair of spider members opposingly arranged and having paired sets of arms radially extending therefrom, each set of said arms having one of said segments connected to its outer end for limited inward and outward movement, a shaft slidably supporting said spider members, means on said shaft for moving said spider members in synchrony in opposite directions on said shaft whereby to contract and expand said mandrel, and a plurality of sets of rollers supported on said arms providing a carriage for the said assembly whereby to movably support the same along a pipe line.

6. In a mandrel for joining pipe sections for welding into a pipe line, the combination comprising an expansible band formed in a plurality of longitudinally associated segments, each having its ends oppositely obliquely formed and having a laterally slidable connection with its companion member providing for sliding interlocking connection to its companion, a pair of spider members oppositely arranged, each having a hub and a plurality of pairs of radial arms, means on the outer ends of each pair of said arms providing a movable connection with one of said segments, a shaft for slidably supporting said spider members, and means on said shaft for moving said spiders in opposite directions in synchrony to retract and expand said band by moving said segments laterally.

References Cited in the file of this patent

UNITED STATES PATENTS

| Number | Name | Date |
| --- | --- | --- |
| 180,169 | Tasker | July 25, 1876 |
| 291,282 | Blue | Jan. 1, 1884 |
| 1,922,324 | Price et al. | May 15, 1933 |
| 2,167,886 | Graham et al. | Aug. 1, 1939 |
| 2,525,680 | Ingemarson | Oct. 10, 1950 |